United States Patent
Quinn et al.

(10) Patent No.: US 9,930,008 B2
(45) Date of Patent: Mar. 27, 2018

(54) DYNAMIC SERVICE CHAIN WITH NETWORK ADDRESS TRANSLATION DETECTION

(71) Applicant: CISCO TECHNOLOGY, INC., San Jose, CA (US)

(72) Inventors: Paul Quinn, Wellesley, MA (US); Jim Guichard, New Boston, NH (US); Surendra Kumar, San Ramon, CA (US); Peter Bosch, Aalsmeer (NL)

(73) Assignee: Cisco Technology, Inc., San Jose, CA (US)

( * ) Notice: Subject to any disclaimer, the term of this patent is extended or adjusted under 35 U.S.C. 154(b) by 693 days.

(21) Appl. No.: 14/225,279

(22) Filed: Mar. 25, 2014

(65) Prior Publication Data

US 2015/0281173 A1    Oct. 1, 2015

(51) Int. Cl.
| | | |
|---|---|---|
| G06F 15/16 | (2006.01) | |
| H04L 12/28 | (2006.01) | |
| H04L 29/12 | (2006.01) | |
| H04L 12/24 | (2006.01) | |

(52) U.S. Cl.
CPC ........ H04L 61/256 (2013.01); H04L 41/0893 (2013.01); H04L 61/2507 (2013.01); *H04L 61/6068* (2013.01)

(58) Field of Classification Search
CPC ..... H04L 45/38; H04L 45/306; H04L 45/745; H04L 47/125; H04L 47/2483; H04L 41/50; H04L 45/00; H04L 47/2408; H04L 47/2441; H04L 41/0893; H04L 61/2507; H04L 61/6068; H04L 61/256; H04L 12/28; G06F 15/16

USPC ........................................................ 709/245
See application file for complete search history.

(56) References Cited

U.S. PATENT DOCUMENTS

| | | | | |
|---|---|---|---|---|
| 6,606,316 | B1 * | 8/2003 | Albert ................... | H04L 41/046 370/389 |
| 7,746,862 | B1 * | 6/2010 | Zuk ...................... | H04L 63/0227 370/392 |
| 9,258,742 | B1 * | 2/2016 | Pianigiani ............. | H04L 67/327 |
| 2013/0227071 | A1 | 8/2013 | Valluri et al. | |
| 2013/0346629 | A1 | 12/2013 | Wang et al. | |
| 2014/0341029 | A1 * | 11/2014 | Allan .................... | H04L 47/125 370/235 |

(Continued)

OTHER PUBLICATIONS

Rijsman J Moisand Juniper Networks B:"Metadata Considerations: draft-rijsman-sfc-metadata-considerations-00.txt",IETF,ISOC 4,Feb. 13, 2014,pp. 1-30.

(Continued)

*Primary Examiner* — Tonia L Dollinger
*Assistant Examiner* — Kishin G Belani
(74) *Attorney, Agent, or Firm* — Cindy Kaplan

(57) ABSTRACT

In one embodiment, a method includes receiving a packet associated with a flow at a network device, classifying the packet at the network device based on information received from a policy layer, inserting a Network Address Translation (NAT) indicator for the flow into the packet, and transmitting the packet in a service chain comprising network address translation. The NAT indicator is associated with the flows before and after network address translation to provide symmetry between the service chain and a return traffic service chain. An apparatus and logic are also disclosed herein.

20 Claims, 4 Drawing Sheets

(56) References Cited

U.S. PATENT DOCUMENTS

2015/0195197 A1* 7/2015 Yong ..................... H04L 45/74
370/392

OTHER PUBLICATIONS

Quinn P et al:"Service Function Chaining (SFC) Architecture; draft-quinn-sfc-arch-04.txt",IETF;ISOC 4,Jan. 29, 2014,pp. 1-21.
Li Y Jiang Huawei Technologies H;"Requirements for Service Chaining; draft-li-service-chaining-requirements-00.txt",IETF,ISOC 4,Jun. 27, 2013,pp. 1-5.
Seyed Kaveh Fayazbakhsh et al:"FlowTags",Hot Topics in Software Defined Networking,Aug. 16, 2013,pp. 19-24.

* cited by examiner

DYNAMIC SERVICE CHAIN WITH NETWORK ADDRESS TRANSLATION DETECTION

TECHNICAL FIELD

The present disclosure relates generally to communication networks, and more particularly, to service chains with network address translation.

BACKGROUND

Network services are widely deployed and important in many networks. Services provide a range of features such as security, wide area network acceleration, firewall, server load balancing, deep packet inspection, intrusion detection service, and Network Address Translation (NAT). NAT is a commonly used service that translates an Internet Protocol (IP) address used within one network to a different IP address known within another network.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
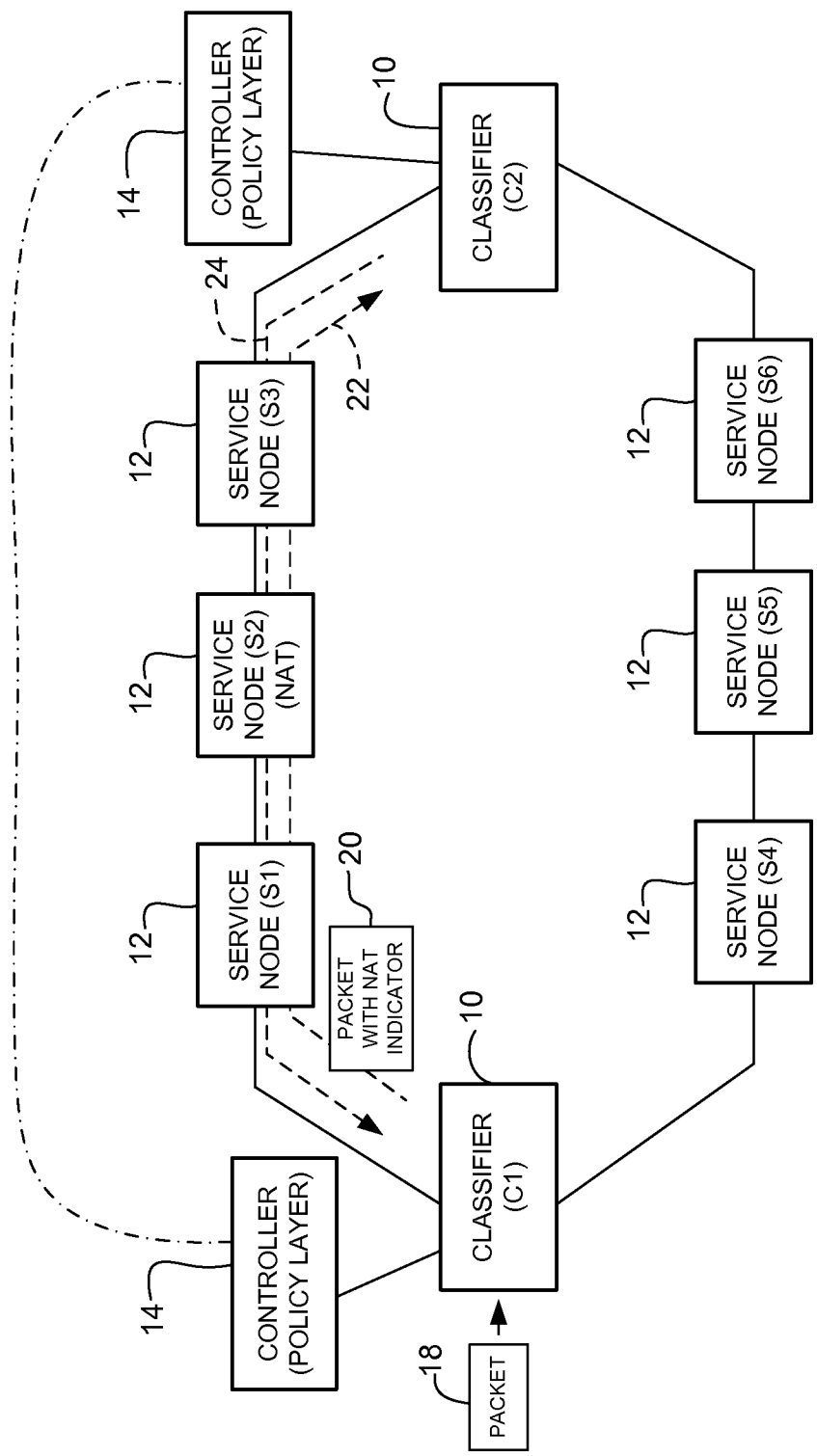
FIG. 1 illustrates an example of a network in which embodiments described herein may be implemented.

In one embodiment, a method generally comprises receiving a packet associated with a flow at a network device, classifying the packet at the network device based on information received from a policy layer, inserting a Network Address Translation (NAT) indicator for the flow into the packet, and transmitting the packet in a service chain comprising network address translation. The NAT indicator is associated with the flow before network address translation and a flow after network address translation at the policy layer to provide symmetry between the service chain and a return service chain In another embodiment, an apparatus generally comprises a processor for classifying a packet associated with a flow based on information received from a policy layer, inserting a Network Address Translation (NAT) indicator for the flow into the packet, and transmitting the packet in a service chain comprising network address translation, and a network interface for communication with a service node. The NAT indicator is configured for binding the flow before network address translation to a flow after network address translation at the policy layer to provide symmetry between the service chain and a return service chain In yet another embodiment, a method generally comprises receiving at a network device, a packet in a service chain comprising network address translation, the packet comprising a Network Address Translation (NAT) indicator associated with a flow before network address translation, transmitting from the network device to a policy layer the NAT indicator and information identifying a flow after network address translation, and transmitting a return packet on a return service chain. The policy layer is operable to bind the flow before network address translation to the flow after network address translation using the NAT indicator to provide symmetry between the service chain and the return service chain.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Network services may be employed at different points in a network infrastructure, including for example, wide area network, data center, campus, and the like. The services may be applied as part of a service chain. A service chain is a data structure defining a set of service nodes hosting various service functions and the order in which the service functions should be applied to the data of selected traffic. Service chaining involves the interception of traffic and directing of traffic through a series of service nodes (i.e., physical or virtual devices) that each support one or more service functions. NAT (Network Address Translation) may present a challenge when deployed in conjunction with other services that need traffic to return through the same set of services. In many cases, service chains need symmetry so that traffic returns through the same set of services in the reverse (return) direction as in the forward direction. Since NAT changes the original destination (using destination NAT as an example), determining the return classification and resultant services to traverse in a consistent manner may be difficult in conventional networks. Operator intervention may be relied on, however, this does not allow for dynamic or scalable NAT deployment.

Certain embodiments described herein may be used to inform the service chaining infrastructure that NAT has occurred and provide enough information so that services and classifiers have sufficient context to properly handle both forward and reverse traffic flows after NAT has taken place. As described in detail below, one or more embodiments leverage the control plane used for chaining and classification. The data plane provides automatic detection that NAT was performed in the service chain to ensure symmetric service chaining (i.e., traffic returns through same set of services in the reverse direction as in the forward direction). In-band NAT detection and data plane symmetry is provided without operator intervention or changes to the NAT service.

Referring now to the drawings, and first to FIG. 1, an example of a network in which embodiments described herein may be implemented is shown. The embodiments operate in the context of a data communication network including multiple network devices. For simplification, only a small number of nodes are shown. It is to be understood that the network shown in FIG. 1 is only an example and that other networks comprising different network devices or topologies may be used without departing from the scope of the embodiments.

The network shown in FIG. 1 includes two classifiers 10 (C1, C2), a plurality of service nodes 12 (S1, S2, S3, S4, S5, S6), and controller (policy layer) 14. The classifiers 10 may be in communication with any number of nodes (e.g., user nodes, servers, or other network devices) or networks. The nodes 10, 12, 14 may be located in one or more networks along with any number of other network devices. For example, one or more of the service nodes 12 may be located in a different network from the other service nodes. The network may include any number of edge devices or intermediate (core) nodes (e.g., routers, switches, access layer devices, aggregation layer devices, gateways, or other network devices), which facilitate passage of data within the network. There may also be any number of network devices interposed between the nodes shown in FIG. 1.

The service nodes 12 each host or support one or more service functions for application to the payload of traffic passing through the respective service node. The service function is responsible for specific treatment of received packets and may operate at the network layer or other OSI (Open Systems Interconnection) layer. The service function may be a virtual instance or embedded in a physical network element. For example, the service node 12 may be a physical device that hosts one or more service functions and has one or more network locators associated with it for reachability and service delivery. Examples of service nodes 12 include firewalls, load-balancers, deep packet inspectors, or other nodes that perform one or more functions including, for example, security, wide area network acceleration, server load balancing, intrusion detection, network address translation, and the like. Multiple service functions may be embedded in the same network element 12.

As shown in the example of FIG. 1, there are multiple service nodes on different paths that the traffic may pass through. In many cases it is important that traffic returns through the same set of services in the reverse direction as in the forward direction. For example, if traffic is transmitted on a service chain passing through service nodes S1, S2, and S3 (path 22), it may be important that the return traffic passes through the same service nodes (S3, S2, S1) (path 24) in the reverse direction (rather than pass through service nodes S6, S5, S4).

The controller 14 (also referred to herein as a policy controller or policy layer) provides information to the classifier 10 that is used to classify traffic. The policy layer may also be located at another node in the network. The controller 14 may be a physical device or a virtual element. The policy layer 14 may be located at one network device or distributed throughout the network at different network devices in communication with one another or a central controller, for example.

In certain embodiments, the classifier 10 performs classification, imposes a service header, and creates a service path. Classification may include, for example, locally instantiated policy and customer/network/service profile matching of traffic flows for identification of appropriate outbound forwarding actions. The classifier 10 may be a switch, router, gateway, or other network device configured to perform forwarding functions and operations described herein. The classifier 10 forms the logical edge of the service chain and may be referred to as a head-end node to the service chain. Traffic (packet/frame) 18 is steered from the classifier 10 through the service functions using one or more Layer 2 (L2)/Layer 3 (L3) service overlays in the network. The controller 14 (or another network device) may include service chaining logic as described in U.S. patent application Ser. No. 14/168,447, filed Jan. 30, 2014, for example. The service chaining logic defines one or more service chains for selection by classification and mapping logic of classifier 10, for example. It is to be understood that this is only an example and that other methods may be used to form service chains.

Referring again to FIG. 1, traffic flows from a source to the classifier C1 and may be directed to a destination in communication with classifier C2, for example. A flow is a sequence of packets sent from a source to a destination that the source desires to label as a flow. The flow may be identified, for example, by a five tuple {protocol, source IP address, destination IP address, source port, destination port}.

In the example shown in FIG. 1, service node S2 performs Network Address Translation (NAT), in which case the flow loses its identity (i.e., identity is transformed) after going through the service device. As described in detail below, a NAT indicator is inserted into packet 18 by the classifier 10 and transmitted with packet 20 through the service chain to ensure proper symmetric chaining (i.e., traffic passes through same service nodes on return path). In one embodiment, the NAT indicator is inserted in a network service header that is added by a service classification function (e.g., classifier 10 or application) that determines which packets require servicing and correspondingly which service path to follow to apply the appropriate services. Classification of packet 18 may comprise, for example, identification of the NAT indicator to insert into the packet based on the flow. Examples of a service header and NAT indicator are described further below with respect to FIG. 4.

Figure 2:
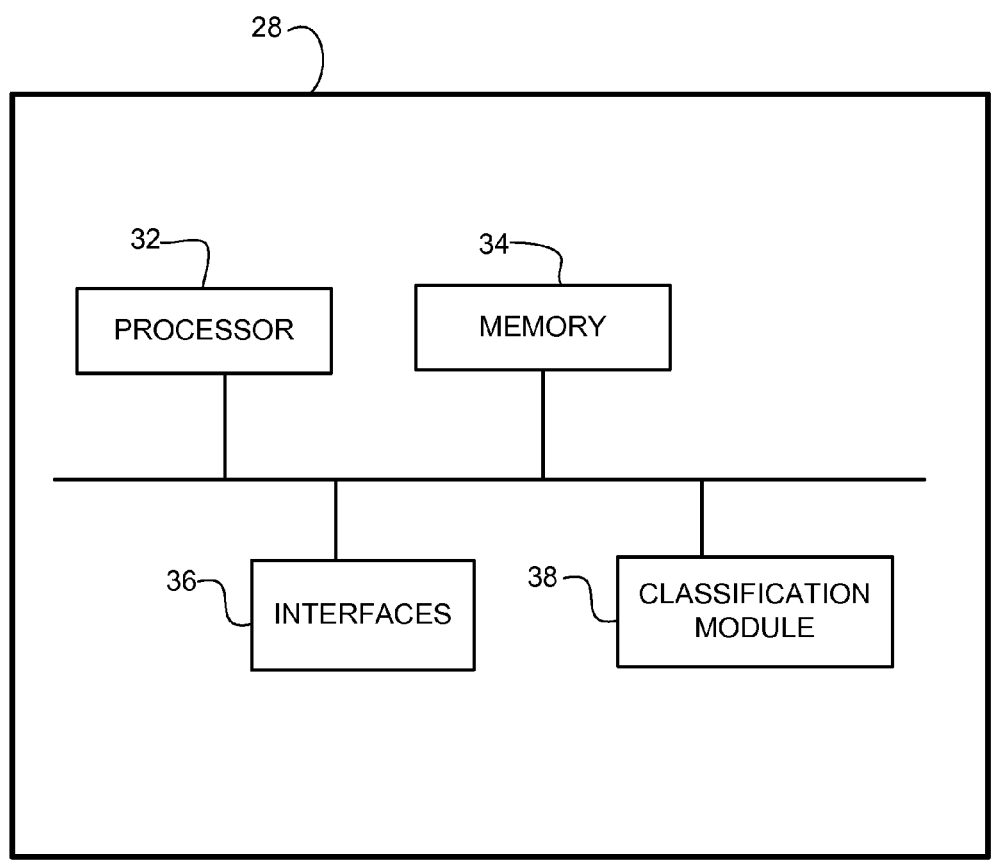
FIG. 2 depicts an example of a network device useful in implementing embodiments described herein.

An example of a network device (e.g., classifier) 28 that may be used to implement embodiments described herein is shown in FIG. 2. In one embodiment, network device 28 is a programmable machine that may be implemented in hardware, software, or any combination thereof. The device 28 includes one or more processor 32, memory 34, network interfaces 36, and classification module 38. Memory 34 may be a volatile memory or non-volatile storage, which stores various applications, modules, and data for execution and use by the processor 32. For example, classification module 38 (e.g., code, logic, software, firmware, etc.) may be stored in memory 34.

Logic may be encoded in one or more tangible computer readable media for execution by the processor 32. For example, the processor 32 may execute codes stored in a computer readable medium such as memory 34. The computer readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 28 may include any number of processors 32.

The network interfaces 36 may comprise any number of interfaces (linecards, ports) for receiving data or transmitting data to other devices. The interface 36 may include, for example, an Ethernet interface for connection to a computer or network. One or more network interfaces 36 may be in communication with one or more service nodes 12.

It is to be understood that the network device 28 shown in FIG. 2 and described above is only an example and that network devices having different components and configurations may be used without departing from the scope of the embodiments. For example, the network device 28 may further include any suitable combination of hardware, software, algorithms, processors, memory, devices, components, or elements operable to facilitate the capabilities described herein.

Figure 3:
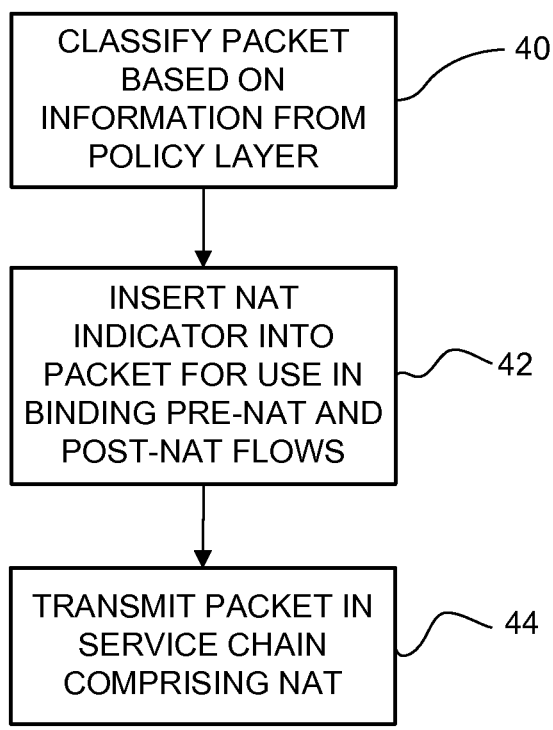
FIG. 3 is a flowchart illustrating an overview of a process for network address translation detection in a dynamic service chain, in accordance with one embodiment.

FIG. 3 is a flowchart illustrating an overview of a process for network address translation detection in a dynamic service chain, in accordance with one embodiment. A packet (e.g., packet/frame 18 in FIG. 1) associated with a flow is received at a classifier (e.g., classifier C1 in FIG. 1). The classifier 10 classifies the packet based on information received from the policy layer (step 40). The classifier 10 may, for example, query the policy layer 14 about how to classify incoming traffic. Alternatively, the policy layer may pre-program the classification rules so that the query is avoided when the packet arrives. If it is determined that the packet needs servicing, a service header is imposed. For example, the classifier 10 may consult a policy element (e.g., controller 14) and based on this policy, impose an appropriate service header to redirect traffic into the service chain. The classifier inserts a NAT indicator for the flow into the packet (step 42) and transmits the packet in a service chain (step 44). In one embodiment, the NAT indicator is inserted into a service header, described below with respect to FIG. 4.

One of the services in the service chain comprises network address translation and the NAT indicator is associated with the flow before network address translation and the flow after network address translation at the policy layer 14 to bind the flows, thereby providing symmetry between the forward service chain and return traffic service chain. As described in detail below, when service node S2 performs NAT, the NAT indicator is not changed. Classifier C2 reports the flow and associated NAT indicator to the policy layer 14, which binds pre-NAT and post-NAT flows using the NAT indicator. When return traffic passes through classifier C2, the policy layer 14, using the binding created in the forward flow, provides the appropriate classification to ensure that the reverse packets follow the reverse path of the forward packets. When the classifier C1 receives the return traffic, it removes the service header and forwards the traffic to the correct destination.

It is to be understood that the process shown in FIG. 3 and described above is only an example and that steps may be added or modified without departing from the scope of the embodiments.

Referring again to FIG. 1, the following example describes use of the NAT indicator in service chain C1→S1→S2→S3→C2 (path 22), in accordance with one embodiment. Upon receiving traffic, classifier C1 queries the policy layer 14 as to how to classify the incoming traffic. The policy layer 14 returns to the classifier 10, classification criteria for service chain creation and service header values. In one embodiment, a cookie that is unique for the flow is used as the NAT indicator. The classifier C1 may insert the cookie into a service header context field, as described below. Packets enter the service chain with a constant cookie value. When NAT at S2 changes the destination address, the cookie remains unchanged. Packets flow through the service chain to the egress node C2. Classifier C2 reports the new flow and associated cookie to the policy layer 14. The policy layer binds pre-NAT and post-NAT flows using the cookie as an identifier.

The reverse flow follows the path C2→S3→S2→S1→C1 by using the NAT indicator to provide service chain symmetry. The policy layer 14, using the binding previously presented during the forward flow, provides the appropriate classification and service header information needed to ensure that the reverse packets follow the correct sequence of services. Classifier C2 imposes the service header, including the NAT indicator (e.g., cookie) on the return traffic. Classifier C2 redirects packets to return service chain S3→S2→S1→C1 (path 24).

As noted above, the NAT indicator may be inserted into a service header in certain embodiments. In one embodiment, the service header is part of the data plane of a service chain and may include information used for service chaining, as well as metadata specifically formatted for consumption by a service function. The metadata may include, for example, an application identifier (ID), flow or path ID, client or user ID, network classification information used for deriving targeted service policies and profiles, and common metadata related to a particular service.

Figure 4:
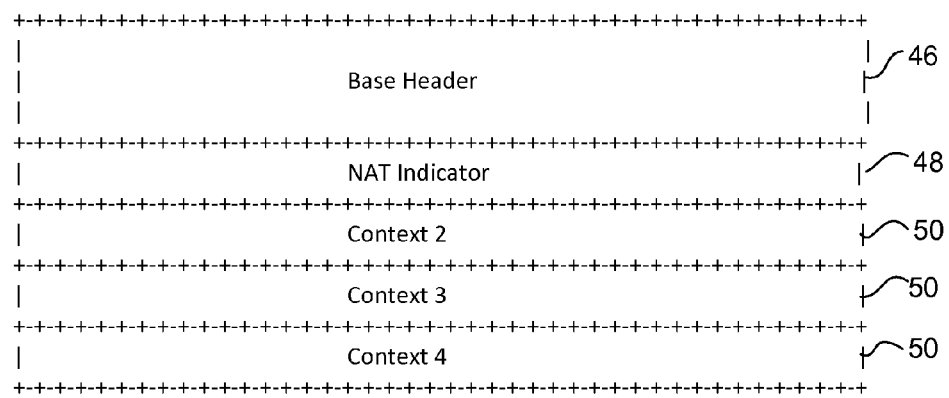
FIG. 4 is an example of a service header for use in network address translation detection, in accordance with one embodiment.

FIG. 4 illustrates an example of a network service header format that may be used to transmit the NAT indicator, in accordance with one embodiment. In one example, the network service header is composed of a 64-bit base header 46 and four 32-bit context headers 48, 50. The NAT indicator may be inserted into one of the context fields, as shown in FIG. 4. The base header 46 provides information about the service header and service path identification. The context headers 50 may carry opaque metadata.

The service header may be, for example, a network service header as described in IETF Draft "Network Service Header", P. Quinn et al., Feb. 14, 2014 (draft-quinn-sfc-nsh-02.txt). It is to be understood that this is only an example and that other formats may be used without departing from the scope of the embodiments.

In certain embodiments, the packet and service header may be encapsulated in an outer header for transport. After the network service header is added to the packet, an outer encapsulation is used to forward the original packet and the associated metadata to the start of a service chain. The encapsulation may be used to create a topologically independent services plane, in which packets are forwarded to the services without changing the underlying network topology. Transit network nodes forward the encapsulated packets. The service header is independent of the encapsulation used. The presence of the network service header may be indicated via protocol type or other indicator in the outer encapsulation, for example.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving a packet associated with a flow at a network device comprising a head-end node of a service chain;
   classifying the packet at the network device based on information received from a policy layer that binds a pre-NAT (Network Address Translation) flow to a post-NAT flow with a NAT indicator, wherein NAT translates a destination address;
   inserting the NAT indicator for the flow into the packet, wherein the NAT indicator is inserted in a network service header comprising information used in service chaining;
   transmitting the packet in a service chain comprising a service node performing network address translation in which an identity of the pre-NAT flow is transformed after passing through the service node; and receiving a return packet associated with the flow, the packet comprising the NAT indicator inserted in the network service header of the packet by a head-end node of a return service chain based on information received from the policy layer, wherein the network service header is added to the packet to realize service function paths;

wherein the NAT indicator is associated with the flow before network address translation and the flow after network address translation at the policy layer to provide symmetry between the service chain and a return service chain after network address translation changes the destination address for the flow such that return traffic passes through a same set of service nodes in a reverse direction.

2. The method of claim 1 further comprising receiving a return packet associated with the flow, the packet comprising the NAT indicator inserted by a classifier based on information received from the policy layer.

3. The method of claim 1 wherein the NAT indicator is inserted in a network service header comprising information used in service chaining.

4. The method of claim 1 wherein the NAT indicator comprises a cookie.

5. The method of claim 1 wherein the network device comprises a classifier.

6. The method of claim 1 wherein the service chain is dynamically created at the network device.

7. The method of claim 1 wherein the NAT indicator is inserted in a data plane header.

8. The method of claim 1 further comprising creating a service path at the network device.

9. An apparatus comprising:
a processor for classifying a packet associated with a flow based on information received from a policy layer that binds pre-NAT (Network Address Translation) flow to a post-NAT flow with a NAT indicator, wherein NAT translates a destination address, inserting a Network Address Translation (NAT) indicator for the flow into a network service header comprising information used in service chaining in the packet, transmitting the packet in a service chain comprising a service node performing network address translation in which an identity of the pre-NAT flow is transformed after passing through the service node, and receiving a return packet associated with the flow, the packet comprising the NAT indicator inserted in the network service header of the packet by a head-end node of a return service chain based on information received from the policy layer, wherein the network service header is added to the packet to realize service function paths; and a network interface for communication with a service node;

wherein the NAT indicator is configured for binding the flow before network address translation to a flow after network address translation at the policy layer to provide symmetry between the service chain and a return service chain after network address translation changes the destination address for the flow such that return traffic passes through a same set of service nodes in a reverse direction.

10. The apparatus of claim 9 wherein the NAT indicator is inserted in a network service header comprising information used in service chaining.

11. The apparatus of claim 9 wherein the NAT indicator comprises a cookie.

12. The apparatus of claim 9 wherein the apparatus comprises a classifier.

13. The apparatus of claim 9 wherein the apparatus is operable to dynamically create the service chain.

14. The apparatus of claim 9 wherein the NAT indicator is inserted in a data plane header.

15. The apparatus of claim 9 wherein the processor is further operable to create a service path at the apparatus.

16. A method comprising:
receiving at a network device comprising a head-end node of a service chain, a packet in a service chain comprising network address translation, the packet comprising a Network Address Translation (NAT) indicator associated with a flow before network address translation, wherein NAT translation of a destination address was performed in the service chain;

transmitting from the network device to a policy layer that binds a pre-NAT flow to a post-NAT flow with the NAT indicator, the NAT indicator and information identifying the flow after destination network address translation and used to classify the packet based on information received from the policy layer; and transmitting a return packet on a return service chain using a binding of the pre-NAT flow to the post-NAT flow to direct the return packet to follow a reverse path of the received packet, the packet comprising the NAT indicator inserted in a network service header of the packet based on information received from the policy layer;

wherein the policy layer binds the flow before network address translation to the flow after network address translation using the NAT indicator to provide symmetry between the service chain and the return service chain after network address translation changes the destination address for the flow such that return traffic passes through a same set of service nodes in a reverse direction.

17. The method of claim 16 wherein the NAT indicator is inserted in a network service header comprising information used in service chaining.

18. The method of claim 16 wherein the service chain is dynamically created at the network device.

19. The method of claim 16 wherein the NAT indicator is inserted in a data plane header.

20. The method of claim 16 further comprising creating a return service path at the network device.

* * * * *